United States Patent [19]

Shibata

[11] Patent Number: 4,884,767
[45] Date of Patent: Dec. 5, 1989

[54] LAVATORY MODULE FOR A PASSENGER AIRPLANE

[75] Inventor: Yoji Shibata, Tokyo, Japan

[73] Assignee: Jamco Corporation, Mitaka, Japan

[21] Appl. No.: 315,767

[22] Filed: Feb. 27, 1989

[30] Foreign Application Priority Data

Apr. 4, 1988 [JP] Japan .............................. 62-44734[U]

[51] Int. Cl.<sup>4</sup> ............................................. B64D 11/02
[52] U.S. Cl. .................................. 244/118.5; 296/24.1;
4/664; 4/549; D12/195; 105/315; 312/283
[58] Field of Search ...................... 244/118.5; 105/314,
105/315; 4/661, 628, 629, 630, 514, 663, 664,
546, 548, 549; 52/34, 35; D12/195, 345;
114/189, 71; 312/283, 286; 296/24.1

[56] References Cited

U.S. PATENT DOCUMENTS

| D. 155,335 | 9/1949 | Delcher, Jr. et al. | D12/195 |
| D. 155,363 | 9/1949 | Ray et al. | D12/195 |
| 2,743,683 | 5/1956 | Calhoun | 105/315 |
| 2,882,835 | 4/1959 | Buchanan | 105/314 |
| 4,100,857 | 7/1978 | Gutridge et al. | 105/315 |
| 4,645,145 | 2/1987 | Alie | 244/118.5 |

OTHER PUBLICATIONS

Boeing 747 Illustrated Provisioning Documents, No. 25-40-49-01, pp. 0-1, 25-40-49-02, pp. 0-3, No. 25-40-00, p. 4.
Boeing 767 Illustrated Parts Cataloge, No. 25-41-01-37, pp. 1-4.
DC-10 Illustrated Parts Catalog, No. 25-40-20, pp. 0-4, and 2,3.
Component Maintenance Manual with Illustrated Parts List, No. 25-41-84, pp. 1038-1039.
Components Maintenance Manual with Illustrated Parts List, No. 25-42-13, pp. 1034-1034.

Primary Examiner—Joseph F. Peters, Jr.
Assistant Examiner—Rodney Corl
Attorney, Agent, or Firm—Armstrong, Nikaido, Marmelstein, Kubovcik & Murray

[57] ABSTRACT

A lavatory module for a passenger airplane, enabling a serviceman to carry out a task for replenishing and changing the stock of amenities from outside the lavatory module in a reduced time, facilitating the work for achieving the task, and facilitating passenger' actions to gain access to the amenities. The lavatory module has a lavatory box having a shape conforming to a space in the fuselage of the passenger airplane in which the lavatory module is installed, and is integrally and internally equipped with lavatory equipments, such as a vertically elongate amenity closet having a plurality of amenity storage compartments arranged in a vertical row, a washstand and a toilet bowl. The lavatory box has a front wall facing the passage of the passenger airplane and provided with a service opening closet by a service door hinged so as to be opened from the passage and a passage opening closed by a passage door from the passage. The amenity closet is disposed with the open side thereof in coincidence with the service opening to enable the serviceman to replenish and change the stock of amenities from outside the lavatory module.

3 Claims, 4 Drawing Sheets

LAVATORY MODULE FOR A PASSENGER AIRPLANE

BACKGROUND OF THE INVENTION

1. Field of the Invention

The present invention relates to a lavatory module for a passenger airplane, integrally and internally equipped with lavatory equipments, such as a toilet bowl, a washstand and a toilet closet for storing lavatory conveniences and amenities.

2. Description of the Prior Art

A lavatory module to be installed on a passenger airplane has a lavatory box formed of panels and necessary members in a shape conforming to a space shared for the lavatory module in the fuselage of the passenger airplane.

Items installed within the lavatory module are lavatory equipments including a toilet bowl, a washstand, a toilet closet for storing amenities, such as items of linen, paper cups, sanitary napkins, sickness containers and paper towels, and a waste container storage.

A lavatory shown in FIG. 3 is a conventional lavatory module having a substantially rectangular front wall having an opening 1 formed on one side of the front wall, and a door hinged at one side thereof on the front wall so as to close the opening 1. Items provided on one side wall are a washstand 5 having a bar soap dispenser 4, a paper holder 6 and a paper cup holder 7. Items provided on a back wall adjacent to the side wall are a sanitary napkin container 8, a sickness container storage 9, a toilet tissue container 10 and a linen container 11. A toilet bowl 2 is installed on the floor of the lavatory module. A mirror 12 and a lighting apparatus 13 are provided respectively on appropriate walls.

A lavatory shown in FIG. 4 is another conventional lavatory module. An opening 1 is formed in the front wall of the lavatory module and a door is hinged on the front wall to close the opening 1. A toilet bowl 2 is provided on one side wall of the lavatory module, while a washstand 5 is provided on the back wall opposite the front wall. A waste container 3, a sanitary napkin container 8, a sickness container storage 9 and a toilet tissue container 10 are provided under the washstand 5. A bar soap dispenser 4, a paper towel holder 6, a paper cup holder 7 and a linen container 11 are arranged above the washstand 5 on the back wall. A mirror 12 and a lighting apparatus are provided respectively on appropriate walls.

In those conventional lavatory modules, both the dispensing openings through which passengers take out the amenities, and the service openings through which a serviceman replenishes or changes the stock of amenities are provided inside the lavatory module. Consequently, in replenishing the stock of amenities and changing the waste container, the serviceman must work within the lavatory module. When the amenity containers are provided on the three walls of the lavatory module, manual motions of the serviceman must be carried out along complex lines of motion in replenishing and changing the stock of amenities requiring much time and labor. Since such a serviceman's task at an airport of call must be completed within a limited time while the passengers are not aboard the plane, it has strongly been requested to facilitate the replenishing work and to enable the replenishing task to be completed in a reduced time.

SUMMARY OF THE INVENTION

Accordingly, it is an object of the present invention to provide a lavatory module for a airplane, enabling a serviceman to carry out a task for replenishing and changing the stock of amenities from outside the lavatory module in a reduced time, facilitating the work for achieving the task, and facilitating passengers' actions to gain access to the amenities.

To achieve the object of the invention, the present invention provides a lavatory module having a lavatory box formed in a shape conforming to a space in the fuselage of a passenger airplane, having a front wall provided side by side with a passage opening for passage, and a service opening for replenishing amenity containers with corresponding amenities, a passage door closing the passage opening, and a service door closing the service opening.

A vertically elongate amenity closet is disposed inside the lavatory box of the lavatory module at a position corresponding to the service opening. The interior of the amenity closet is partitioned into a plurality of storage compartments by horizontal partition plates. The storage compartments are open on the side of the service door and dispensing openings respectively for the storage compartments are formed in the back panel of the amenity closet.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENT

Figure 1:
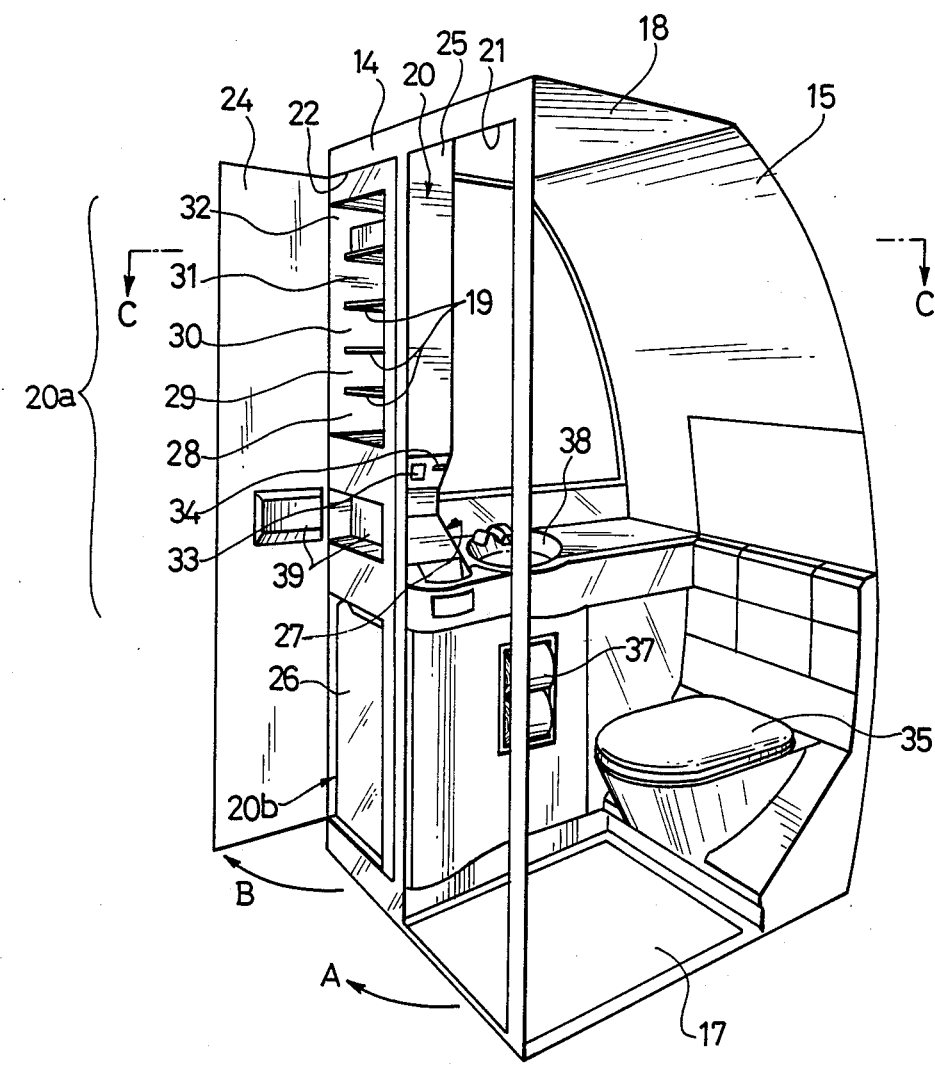
FIG. 1 is a perspective view of a lavatory module embodying the present invention, in which passage door and one side wall are shown transparent.

Referring to FIG. 1, a lavatory module for a passenger plane has a lavatory box consisting of a front wall 14 facing a passage of the passenger airplane, a back wall 15 opposite the front wall 14, right and left walls 16 interconnecting the front wall 14 and the back wall 15, a floor 17 and a ceiling 18. The front wall 14 is substantially rectangular, while the back wall has a shape conforming to that of a corresponding boundary of a space in the fuselage of the passenger airplane in which the lavatory module is installed.

A passage opening 21, i.e., a passageway, is formed on one side of the front wall 14, and a service opening 22 for gaining access to an amenity closet 20 is formed on the other side of the front wall 14 beside the passage opening 21. The passage opening 21 is closed by a passage door 23 pivotally supported at one side thereof so as to open in the direction of an arrow A. The service opening 22 is closed by a service door 24 pivotally supported at one side thereof so as to open in the direction of an arrow B.

Figure 2:
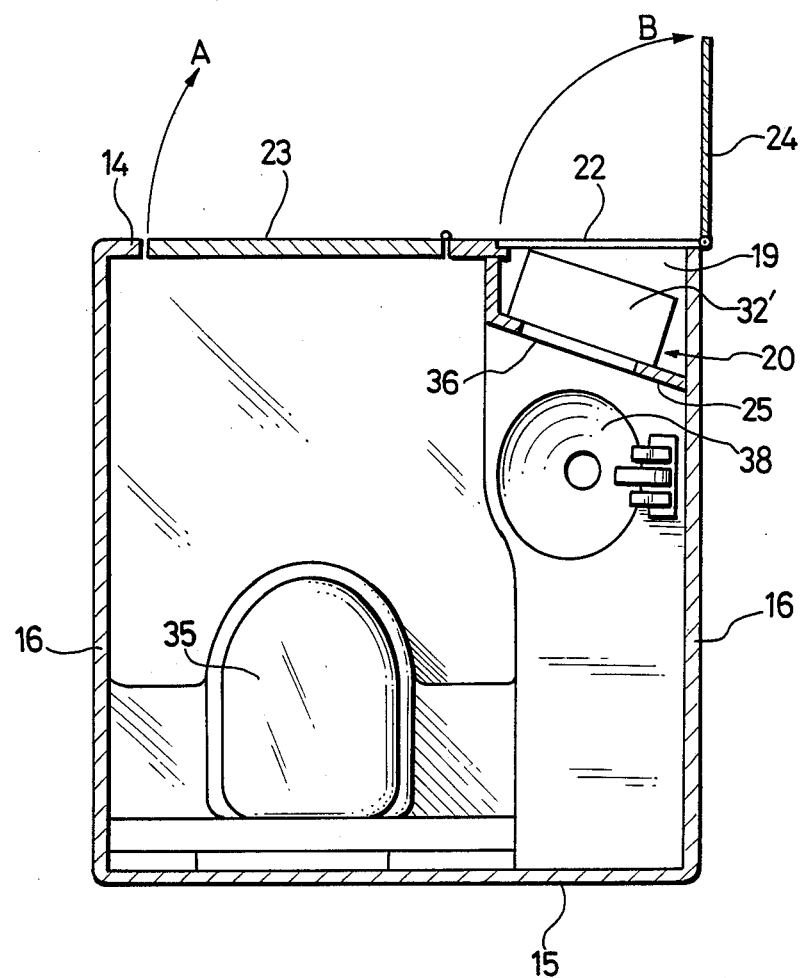
FIG. 2 is a sectional view taken on line C—C in FIG. 1.
Figure 3:
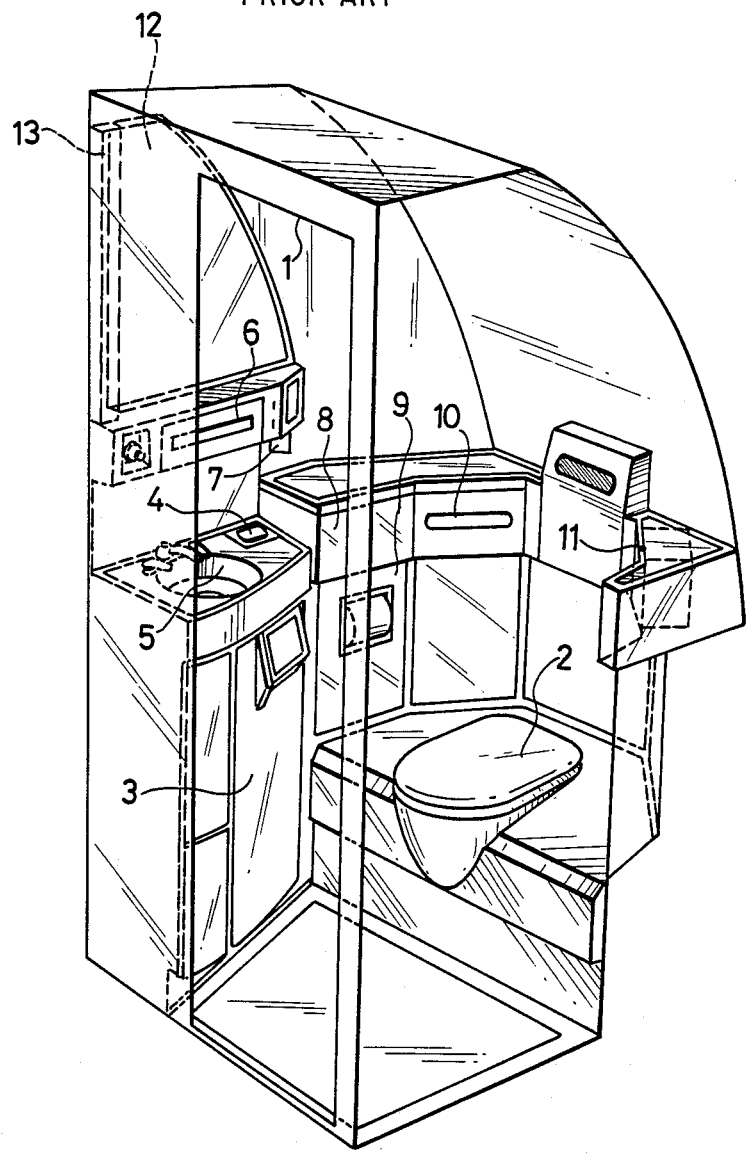
FIGS. 3 and 4 are perspective views of conventional lavatory units.
Figure 4:
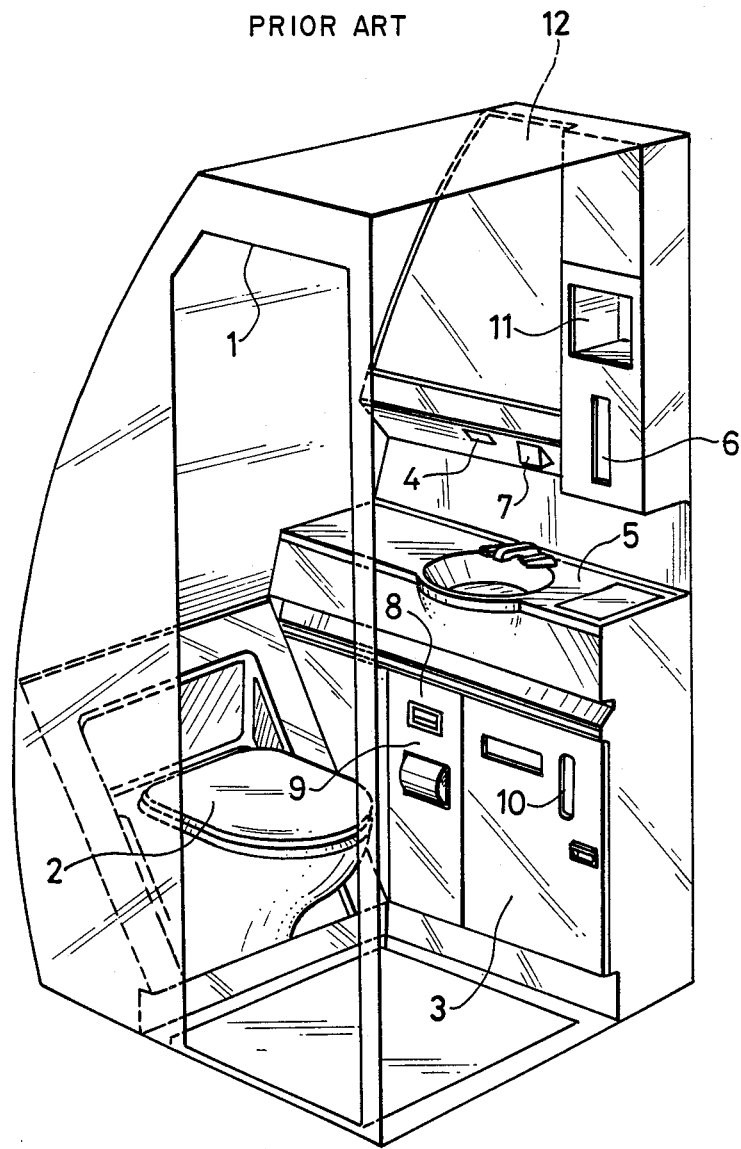

A vertically elongate amenity closet 20 is formed inside the front wall 14 at a position corresponding to the service opening 22. As shown in FIG. 2, the amenity closet 20 is formed of a portion of the front wall 14, a portion of the left side wall 16, as viewed in FIG. 1, and a partition panel 25 bent in a shape to form a side panel and a back panel as shown in FIG. 2. The interior of the amenity closet 20 is partitioned into a plurality of storage compartments 20a by horizontal partition plates 19. A waste container compartment 20b is formed in the lower portion of the amenity closet 20. The lower end of the partition panel 25 is joined to a washstand 38. A toilet paper roll holding unit 37 is provided on the front panel of the washstand 38. A disposal opening 27 connected to the waste container compartment 20b is formed in the front panel of the washstand 38 above the toilet paper roll holding unit 37.

The storage compartments 20a are used respectively, for example, as a paper towel storage compartment 28, a sanitary storage compartment 29, a sickness container storage compartment 30, a linen storage compartment 31 and a toilet tissue storage compartment 32. A paper cup dispensing opening 33 through which a paper cup is dispensed and a soap dispensing opening 34 through which a piece of soap is dispensed are formed in a portion of the partition panel 25 below the paper towel storage compartment 28. Amenity dispensing openings 36 are formed in the back panel portion of the partition panel 25 respectively for the storage compartments 20a. A toilet bowl 35 is held on the back wall 15 of lavatory module.

In using the lavatory, a passenger opens the passage door 23 in the direction of the arrow A to enter the lavatory. The passenger uses the toilet bowl 35 and the washstand 38 and, when necessary, takes out desired amenities stored in the storage compartments 20a through the amenity dispensing openings 36. Used amenities are thrown through the disposal openings 27 into a waste container 26 stored in the waste container compartment 20b.

In replenishing and changing the stock of amenities, a serviceman standing in the passage opens the service door 24 in the direction of the arrow B to gain access to the storage compartments 20a. For example, a tissue box 32' is put in the toilet tissue storage compartment 32 with the tissue dispensing opening thereof in coincidence with the amenity dispensing opening 36 as shown in FIG. 2. The waste container 26 is pulled out from the waste container compartment 20b, the waste container is emptied, and then the empty waste container 26 is returned to the waste container storage compartment 20b. Then the serviceman closes the service door 24 to complete a task for replenishing and changing the amenities.

Since the passage door 23 and the service door 24 are installed side by side, the service door 24 is not provided with any doorknob to enable the passengers to discriminate between the passage door 23 and the service door 24. The latch of the service door 24 is concealed so that service door 24 can be opened only by the serviceman or the crew of the airplane. For example, windows 39 for receiving the serviceman's hand are formed in the service door 24 and the amenity closet 20 to allow the serviceman to operate the latch disposed behind the windows 39.

Thus, the passage opening 21 and the service opening 22 are formed side by side in the front wall 14 facing the passage, and the amenity closet 20 is disposed inside the lavatory module at the position corresponding to the service opening 22. Accordingly, the serviceman is able to carry out the task for replenishing and changing the stock of amenities on the side of the passage of the airplane by opening the service door 24 without entering the lavatory module, which improves the accessibility of the lavatory module remarkably. Furthermore, the serviceman is able to carry out easily the task for replenishing and changing the amenities, since the vertically elongate amenity closet 20 is partitioned into the amenity storage compartments 20a by the horizontal partition plates 19. Still further, since all the amenity storage compartments 20a are exposed simultaneously to the passage simply by opening the service door 24, the serviceman need not open many different doors, which enables the serviceman to achieve the task through simple motions as compared with those in carrying out the same task. Moreover, since the waste container compartment 20b is formed under the amenity closet 20, the serviceman is able to handle the waste container 26 easily, which reduce time and labor necessary for the task also reducing time necessary for the ground service.

Since the amenity storage compartments 20a are in a single vertical row at a single position in the lavatory module, the passengers can easily find the amenity dispensing openings 36 for the desired amenities, and hence the least necessary motions are required for taking out, using and disposing of the amenities, so that the passengers are able to use the narrow lavatory comfortably.

Although the invention has been described in its preferred form with a certain degree of particularity, obviously many changes and variations are possible therein. It is therefore to be understood that the present invention may be practiced otherwise than specifically described herein without departing from the scope and spirit thereof.

What is claimed is:

1. A lavatory module for a passenger airplane, comprising:

a lavatory box consisting of a substantially rectangular front wall provided on one side thereof with a passage opening and on the other side with a service opening adjacent to the passage opening, a back wall opposite the front wall, side walls interconnecting the front and back walls, a ceiling and a floor, and formed in a shape conforming to a space in the fuselage of the passenger airplane in which the lavatory module is to be installed;

a passage door hinged on the front wall so as to close the passage opening and so as to be opened from outside the lavatory box;

a service door hinged on the front wall so as to close the service opening and so as to be opened from outside the lavatory box;

a vertically elongate amenity closet provided within the lavatory box at a position corresponding to the service opening, and having one side opening into the service opening and the opposite side defined by a partition panel.

2. A lavatory module for a passenger airplane, according to claim 1, wherein the interior of said amenity closet is partitioned by a plurality of horizontal partition plates into a plurality of storage compartments and the partition panel is provided with a plurality of amenity dispensing openings arranged in a vertical row at positions respectively corresponding to the storage compartments.

3. A lavatory module for a passenger airplane according to claim 1, wherein a waste container compartment for storing a waste container is formed in the bottom portion of the amenity closet.

* * * * *